(12) United States Patent
Garcia-Tobin (10) Patent No.: US 11,100,014 B2
(45) Date of Patent: Aug. 24, 2021

(54) PROVIDING DATA IN A SHARED MEMORY

(71) Applicant: ARM Limited, Cambridge (GB)

(72) Inventor: Carlos Garcia-Tobin, Soham (GB)

(73) Assignee: Arm Limited, Cambridge (GB)

( * ) Notice: Subject to any disclaimer, the term of this patent is extended or adjusted under 35 U.S.C. 154(b) by 343 days.

(21) Appl. No.: 15/260,525

(22) Filed: Sep. 9, 2016

(65) Prior Publication Data

US 2018/0074736 A1    Mar. 15, 2018

(51) Int. Cl.
  *G06F 12/00*  (2006.01)
  *G06F 13/16*  (2006.01)

(52) U.S. Cl.
  CPC ................ *G06F 13/1663* (2013.01)

(58) Field of Classification Search
  CPC ............ G06F 13/1663; G06F 1/3203
  See application file for complete search history.

(56) References Cited

U.S. PATENT DOCUMENTS

| | | | |
|---|---|---|---|
| 8,751,836 B1* | 6/2014 | Piszczek | G06F 1/3268 713/300 |
| 2012/0166723 A1* | 6/2012 | Araki | G06F 12/0871 711/113 |
| 2018/0329476 A1* | 11/2018 | Zhuo | G06F 3/0625 |

* cited by examiner

*Primary Examiner* — Baboucarr Faal
(74) *Attorney, Agent, or Firm* — Nixon & Vanderhye P.C.

(57) ABSTRACT

A data processing apparatus is provided, comprising controller circuitry. The controller circuitry includes processing circuitry that executes a stream of instructions. Communication circuitry obtains a command from shared storage circuitry to cause the processing circuitry to execute a subset of instructions in the stream of instructions, and proactively transmit additional data to the shared storage circuitry.

19 Claims, 5 Drawing Sheets

PROVIDING DATA IN A SHARED MEMORY

TECHNICAL FIELD

The present disclosure relates to the field of data processing.

DESCRIPTION

In a data processing apparatus, it is sometimes desirable to use a dedicated controller to control operation of a part of the data processing apparatus in response to one or more agents such as Central Processing Units (CPUs) and Graphic Processing Units (GPUs). For example, rather than an Operating System on a CPU controlling power consumption for a data processing apparatus, this task can be offloaded to a dedicated power controller circuit. This way, the underlying operating system can be simplified, since it need not be aware of the requirements and power consumption details of all the different systems on which the operating system might be run. However, it is necessary to provide an interface between agents and controllers so that commands can be provided to the controller and so that data can be provided back to the agent. It may be desirable for the interface to be generic, so that it may be applicable to a number of different use cases. It may also be desirable for agents to operate with the controllers with a low latency if possible.

SUMMARY

Viewed from a first example configuration, there is provided a data processing apparatus comprising controller circuitry, said controller circuitry comprising: processing circuitry to execute a stream of instructions; and communication circuitry to obtain a command from shared storage circuitry to cause said processing circuitry to execute a subset of instructions in said stream of instructions, and to proactively transmit additional data to said shared storage circuitry.

Viewed from a second example configuration, there is provided a data processing method comprising: executing a stream of instructions; obtaining a command from shared storage circuitry to cause said processing circuitry to execute a subset of instructions in said stream of instructions; and proactively transmitting additional data to said shared storage circuitry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising controller circuitry, said controller circuitry comprising: processing circuitry to execute a stream of instructions; and communication circuitry to obtain a command from shared storage circuitry to cause said processing circuitry to execute a subset of instructions in said stream of instructions, and to proactively transmit additional data to said shared storage circuitry.

In the above, a shared memory is used in order for the controller circuitry (e.g. a microcontroller) to receive commands and to proactively transmit the additional data. The commands that are received make it possible to control the behaviour of the controller circuitry, which in turn may have the ability to control other components. In some embodiments, the controller circuitry is able to control a part of the data processing apparatus itself. In some embodiments, the additional data can be unsolicited. For example, it can be provided independently of any commands for that proactive data. The additional/proactive data may therefore not be sent in response to a specific command for the controller to provide that data. Instead, the additional data is sent proactively. The proactively sent additional data can relate to the data processing apparatus (or its operation). However, this need not be the case. For example, the proactive data could relate to a component that, while not part of the data processing apparatus, is nevertheless controllable by the controller circuitry. The proactive data could therefore relate to a component that the controller circuitry is arranged to control. By the above configuration, it is possible to reduce latency, since the time spent issuing a command to the controller circuitry to provide data, interpreting the command at the controller circuitry, acquiring the data, and uploading it to the shared circuitry can be saved. Indeed, the transmission of the proactive data can potentially be made substantially in parallel with a request to the shared storage circuitry for that data. This configuration also reduces the number of commands to which the controller circuitry must be responsive, thereby simplifying the interface of the controller circuitry.

In some embodiments, said communication circuitry is further adapted to transmit requested data to said shared storage circuitry in response to a command received via said communication circuitry. In such embodiments, in addition to proactive data being sent, the controller circuitry is also able to provide requested data in response to an explicit request (via a command) for that data. For some type of data, there can be little value in providing that data proactively. For example, if the data changes repeatedly and if older data is unlikely to have any value, then providing such data proactively is unlikely to be useful. In another example, the data could be so rarely requested that it is not deemed worthwhile for that data to be continually sent proactively, since doing so could limit a bandwidth between the controller circuitry and the shared memory. In these cases, therefore, a command can be provided in order to explicitly provide that data. The proactive data and the requested data could be the same. For example, the proactive data could be provided every predetermined period of time, with the predetermined period of time being selected such that it is adequate for most use cases. However, a command could also be provided for exceptional cases where the most recent version of the data is required. This would allow latency to be reduced for the majority of cases where the data need not be entirely up-to-date, while still making it possible to get an up-to-date version of the data if necessary. There are a number of ways in which data can be provided in response to a command. In some examples, where the command is synchronous, the requested data will be immediately provided to the shared storage circuitry. For example, the transmission of the requested data could be in direct response to the command. In other examples, particularly where an extended period of processing must take place, the command is asynchronous such that the command causes a background task to operate. Once the task is completed (potentially some time later) the data is provided. In these latter examples, therefore, the requested data is still being provided in response to the command, it is merely in indirect response to (or as a consequence of) that command.

In some embodiments, the data processing apparatus further comprises requested data signalling circuitry to signal that said requested data is obtainable from said shared storage circuitry. Such circuitry could be implemented as a register that, when set, causes an interrupt to occur on one or more other devices to indicate that they should access the shared storage circuitry and collect the requested data, and then resets the register. In this way, the requested data signally circuitry can act as a "doorbell".

In some embodiments, the data processing apparatus further comprises command signalling circuitry to signal to said controller circuitry that a new command is obtainable from said shared storage circuitry. Similarly to the requested data signalling circuitry, such circuitry can be used to indicate to the controller circuitry that a command is waiting to be obtained in the shared storage circuitry. The command signalling circuitry can be implemented as a register that causes an interrupt to occur in the controller circuitry and then resets the value in the register. In an interrupt handling routine of the command signalling circuitry, the controller circuitry can then access the command from the shared storage circuitry and execute it.

In some embodiments, said additional data relates to operation of said data processing apparatus over a period of time. For example, the additional/proactive data could be statistical data, such as a counter that increments whenever an event occurs, a timer, or an aggregation of other data values (such as an average or total).

In some embodiments, said controller circuitry comprises power controller circuitry to control power provided to one or more components. By providing power controller circuitry with the ability to control power to a device and distribution of that power among elements of the device, it is possible for such control to be offloaded away from the operating system. This can increase the simplicity of the operating system, since it need not be aware of the configuration of each of the elements within the device, their different operating modes and requirements. Instead, each of the elements can be configured to directly interact with the power controller circuitry as appropriate.

In some embodiments said one or more components comprise said data processing apparatus, which is adapted to operate in one of a plurality of power states; and said additional data relates to operation of said data processing apparatus over a period of time and comprises a residency counter that indicates a period for which said data processing apparatus has been operated in a current power state in said plurality of power states and a usage counter that indicates a number of times said data processing apparatus has entered said current power state. In this embodiment, the controller circuitry comprises power controller circuitry, which controls the power provided to the data processing apparatus. The data processing apparatus operates in one of a plurality of power states. Meanwhile, the proactively sent additional data includes both a residency counter and a usage counter. The residency counter indicates the time for which the data processing apparatus has been in its current state. The usage counter indicates the number of times the data processing apparatus has entered its current state. Such information could be used, for example, to determine whether the device has been running at full power for an extended period of time, which can cause the device to become hot. In some embodiments, the counters are reset whenever the device powers off. However, in other embodiments, the counters could reset when entering a particular power state or in response to a particular event.

For example, in some embodiments, said processing circuitry is responsive to a counter reset command from said shared storage circuitry to reset at least some of said additional data. For example, the above-mentioned residency counter and/or usage counter could be reset by such a command. In some embodiments, such a command could also or alternatively reset data that is to be explicitly requested.

In some embodiments, the data processing apparatus further comprises said shared storage circuitry.

In some embodiments, said shared storage circuitry comprises at least one memory bank. In other embodiments, the shared storage circuitry comprises at least one register. The use of registers may be of particular use for proactive or requested data, which may only be a single value, as opposed to commands, which could comprise a number of parameters. However, provided sufficient storage space is provided by registers, registers can also be used for commands.

In some embodiments, said shared storage circuitry is partitioned into at least two parts, including a first part for storing commands, and a second part for storing said additional data. In some other embodiments, said communication circuitry is further adapted to transmit requested data to said shared memory in response to a command received via said communication circuitry; and said shared storage circuitry is partitioned into at least three parts, including a first part for storing commands, a second part for storing said additional data, and a third part for storing said requested data. By dividing the data into particular sections of the shared memory, it is possible to index directly into a known location in memory where the relevant information (command, requested data, or additional/proactive data) can be found. This reduces the delay spent in searching for particular information, which can occur if the entirety of the shared memory must be searched for relevant information. Additionally, by using such a feature it is possible to take advantage of memory protection schemes, that can be found in processors (e.g. memory management units or memory protection units), to aid correctness and security. For example, between each section it is possible to include unmapped memory, such that an overrun or underrun in a section would result in a fault that can be trapped/detected. Note that each memory area need not be exclusively for its particular type of data. In some embodiments, the memory is split such that by default, each area of memory is owned by a particular device (e.g. the controller circuitry or an agent circuit), but such ownership can be temporarily changed. Such a split makes it possible to implement simple communication exchanges between devices. For example, the controller circuitry could obtain a command from a first region of memory that by default is owned by the agent and is temporarily given to the controller circuitry, while uploading data (possibly simultaneously) to a second region of memory that by default is owned by the controller circuitry.

In some embodiments, at least one agent circuit to store a command in said shared circuitry for said controller circuitry, and to obtain said additional data from said shared circuitry. An agent circuit could be considered to be any circuit that desires control or information from the controller circuitry. Typically, an agent circuit will have its own processing circuitry. For example, the agent circuit could be a Central Processing Unit (CPU) or Graphics Processing Unit (GPU).

In some embodiments, said at least one agent circuit comprises a plurality of agent circuits. In this case, a number of different agent circuits each interface with the controller circuitry. For example, a data processing apparatus could have a first agent circuit in the form of a CPU, a second agent circuit in the form of a GPU, and a controller circuitry in the form of power controller circuitry, which not only controls power into the data processing apparatus as a whole, but also controls the distribution of power to each of the GPU and CPU. For example, while the GPU is not being used, it might request that the power controller circuitry powers the GPU off (or puts the GPU into a standby power state). In another case, in an effort to complete a task quickly, the CPU might request that the power controller circuitry provides the CPU with a boost in power, such that the CPU can increase its clock speed.

In some embodiments, said controller circuitry controls access to a resource to each of said plurality of agent circuits; and each agent circuit in said plurality of agent circuits is to issue a resource request command to said shared storage circuitry to request a change in said resource provided to that agent circuit. The control of access could be a distribution of the resource among the plurality of agent circuits, or it could comprise one or more permissions for access to the resource or related data. For example, the resource in question could be access to a sensor. It could be that certain agents have permission to request a reading from the sensor, whilst other agents do not. The latter group of agent circuits might only be able to access proactive sensor data while the former group of agent circuits could request an immediate, current value from the sensor.

In some embodiments, said processing circuitry is to perform arbitration between resource request commands received from said plurality of agent circuits; and in response to said arbitration, said processing circuitry changes said access to said resource. For example, in some embodiments, the resource is a power consumption. If a first agent circuit requests 80% of the available power and a second agent circuit requests 80% of the available power, then the processing circuitry of the controller circuitry must perform arbitration in order to determine what distribution of power should be used.

In some embodiments, said communication circuitry is further adapted to transmit requested data to said shared storage circuitry in response to a command received via said communication circuitry; and at least one of said command, said requested data, and said additional data is restricted according to one or more domains, each of said one or more domains relating to an operational characteristic of at least part of said data processing apparatus. An example of a first and second domain in a mobile device could be a CPU domain and a modem domain. In the CPU domain, it might be possible to issue commands to observe the modem's performance, but not to set it. Conversely, in the modem domain, it might be possible to both monitor (read) and set (write) what the performance of the modem is.

In some embodiments, in response to a discover command obtained from said shared storage circuitry and provided to said shared storage circuitry by an agent circuit, said requested data comprises information relating to interaction capabilities between said agent circuit and said controller circuitry. Provided that such a command is provided by the controller circuitry and provided that the data is in an understandable format, there may be no requirement for the agent to have specific knowledge regarding the controller circuitry, since the functionality of the controller circuitry can be dynamically determined. This can lead to a simplification of the agent device, which can be made backwards and forwards compatible with a number of different controller circuits, without explicit knowledge of those circuits and without necessarily needing extra information to be provided (e.g. in the form of firmware updates).

Particular embodiments will now be described with reference to the figures.

Figure 1:
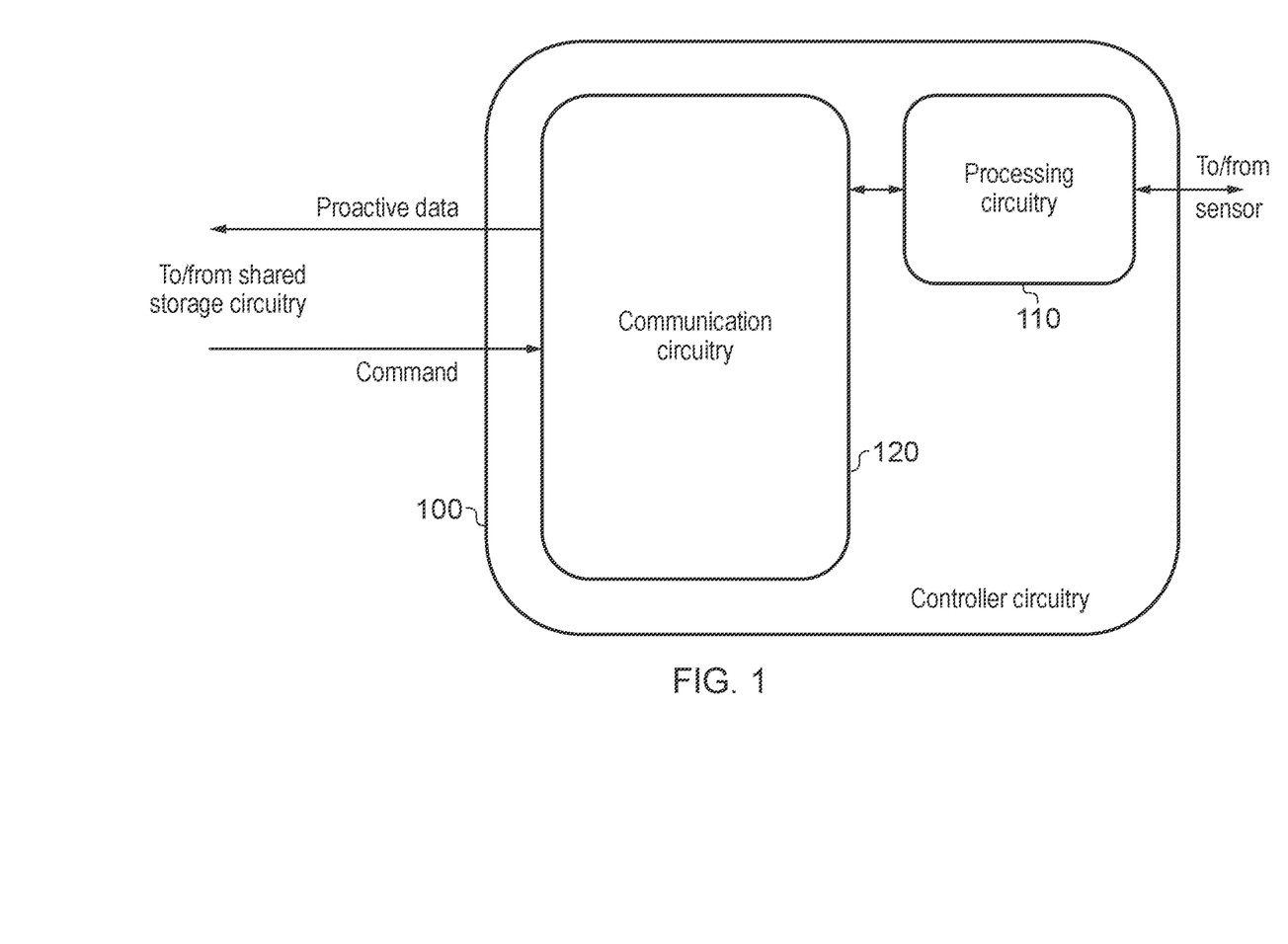
FIG. 1 schematically shows a data processing apparatus in accordance with one embodiment.

FIG. 1 schematically shows a data processing apparatus 100 in accordance with one embodiment. In this embodiment, the data processing apparatus 100 takes the form of controller circuitry. The controller circuitry includes processing circuitry 110 (e.g. a processor) for executing a stream of instructions. The stream of instructions thereby defines the behaviour of the controller circuitry. In this example, the processing circuitry is able to communicate with a sensor (not part of the data processing apparatus in this embodiment) in order to obtain sensor readings. In addition to the processing circuitry, the data processing apparatus 100 includes communication circuitry 120. The communication circuitry 120 communicates with a shared memory (also not part of the data processing apparatus in this embodiment) in order to receive commands and to proactively send additional data. The commands cause the controller circuitry to behave in a particular way. Meanwhile, the proactive/additional data that is sent out is not sent out in response to any received command. For example, independently of any command for (proactive) sensor data, the sensor data will still be transmitted proactive by the communication circuitry. Note that although the proactive sensor data is not sent in response to any command for that data, a command could still be issued in order to control the way that proactive data is sent. For example, a command might affect a period with which the data is sent, or a compression to be formed on the data, etc.

As a consequence of the sensor data being transmitted proactively (e.g. independently of a command for that data), there is no need for the controller circuitry 100 to receive a command for the data, process the command, query the sensor for the latest data, interpret the data received from the sensor and then transmit the requested data to the shared memory. Instead the data is sent without being requested, which can thereby reduce latency experienced by an agent that desires the data.

Figure 2:
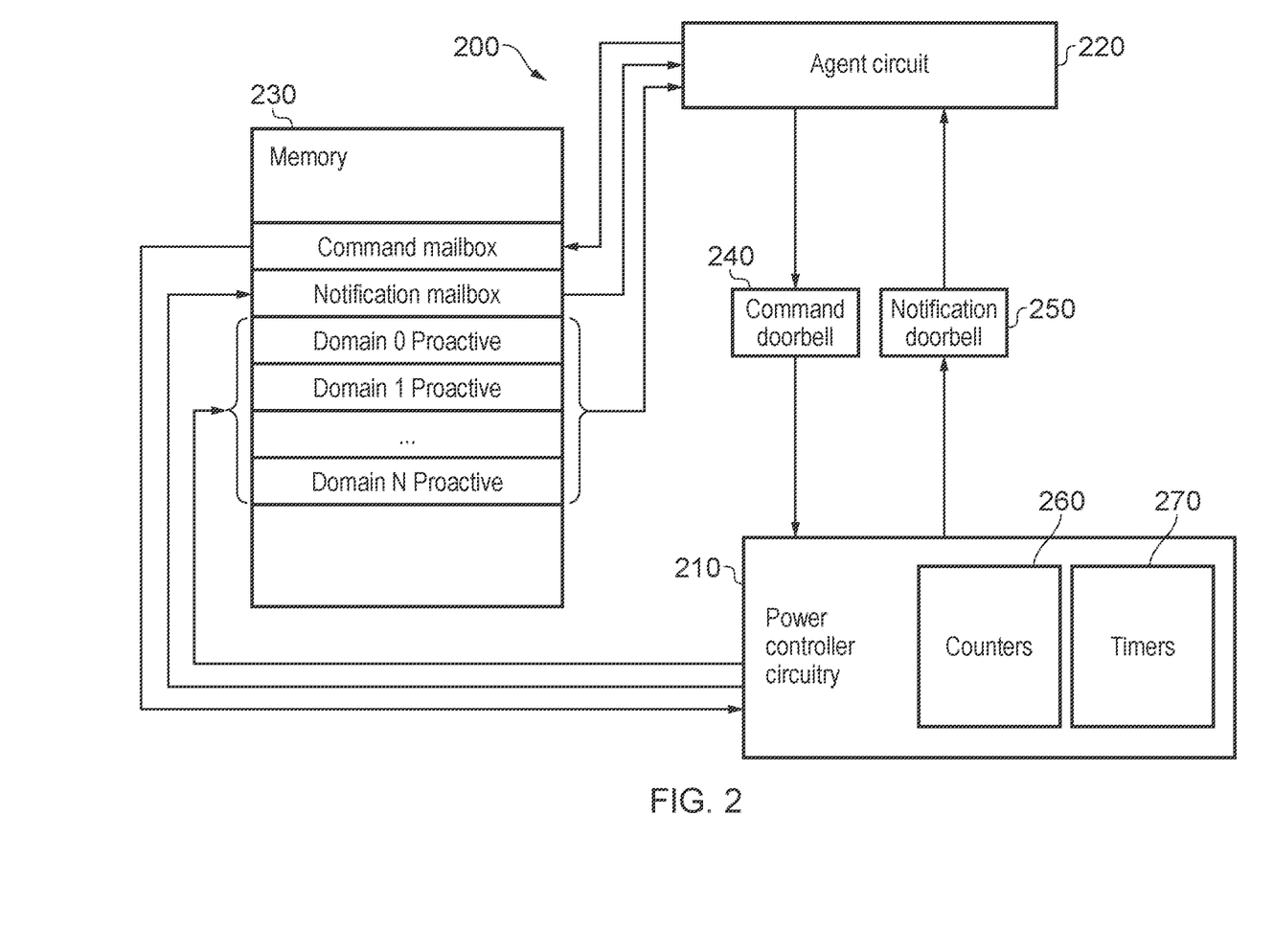
FIG. 2 schematically illustrates a data processing apparatus including controller circuitry, an agent, and a shared memory, in accordance with one embodiment.

FIG. 2 schematically illustrates a data processing apparatus 200 including controller circuitry 210, an agent 220, and a shared memory 230, in accordance with one embodiment. In this example, the controller circuitry 210 takes the form of power controller circuitry 210 for controlling power to the data processing apparatus 200. The agent 220 and the power controller circuitry 210 communicate via a shared memory 230, which can be made up of one or more memory banks. The memory is divided into a number of sections for storing different types of data. For example, one of the sections is a command mailbox, into which commands can be written by the agent 220 to be received by the controller circuitry 210. A notification mailbox can be used to store notifications (e.g. requested data) from the controller circuitry 210 to the agent 220. Another section of the memory is used to store additional/proactive data from multiple domains (discussed later). Note that the mailboxes need not be exclusively used by data of a specific type. In particular, when the agent circuit 220 sends a command to the controller circuitry 210, the agent writes the command to the command mailbox in the memory, and then signals a command doorbell 240. This raises an exception at the power control circuitry 210, which in turn reads the shared memory 230 to obtain the command from the command mailbox. The command can be synchronous or asynchronous. With a synchronous command, the power controller circuitry 210 immediately responds to the command by providing the requested data back to the command mailbox. A set of further signals are used in order to indicate whether the agent circuit 220 or the power control circuitry 210 currently has write access to the mailbox. Synchronous commands are generally used when little processing is required in order to respond to the command. If some processing must take place, then an asynchronous command is used. This causes a background task to be executed to prepare the data. Once it is ready, the requested data is then written back to the notification mailbox of the shared memory 230 in the form of a notification. The notification doorbell 250 is then activated, which causes an interrupt at the agent circuit 220. This causes the agent circuit 220 to access the shared memory 230 and retrieve the notification.

In some embodiments, the notification and command mailboxes are owned (by default) by the controller circuitry and agent respectively. However, such ownership can be temporarily switched. In some embodiments, the memory, together with the agent circuit and controller circuitry, uses a master/slave model. In particular, for commands, the agent acts as a master and the controller circuitry acts as a slave. However, for notifications (e.g. data uploads caused by asynchronous commands), the controller circuitry acts as the master and the agent acts as the slave. The access to each section of memory in such relationships can then be requested/provided as appropriate. The skilled person will be aware of such signalling processes that can be used in order to prevent or inhibit deadlocks and livelocks.

Independently of such commands, as per the embodiment described with reference to FIG. 1, the power control circuitry provides proactive data to the shared memory 230 this occurs every predetermined period of time (e.g. every second). Such proactive data is provided without any request for that data being made. The agent circuit 220 can therefore obtain the data with low latency. However, such data could be up to one second old. In most cases, this will be acceptable. Where the data must be highly up-to-date, the agent circuit 220 issues an explicit command to the power controller circuitry 210, which can then respond with the up-to-date value of the data. This process has a higher latency, but the provided data is more recent. Note that the proactive data need not be provided after each period of time, but can instead be provided on occurrence of an event. For example, a count of the number of times a CPU has gone into a power state can be updated by the power controller every times it happens.

In this embodiment, the data takes the form of a residency counter and usage timer for a current power state of the data processing apparatus. In particular, the data processing apparatus has a number of power states. The power consumed by the data processing apparatus 200 depends on the power state in which it operates. Transitions between the power states occur via the power controller circuitry 210 (e.g. via a command). The residency counter is indicative of the number of times the current power state has been entered whilst the usage timer is indicative of the length of time for which the data processing apparatus 200 has been in its current power state. The power controller circuitry 210 contains a set of counters 260 and a set of timers 270, with one counter and one timer being provided for each power state in which the data processing apparatus 200 can operate. Note that in some embodiments, the power states are controllable for each agent rather than for the data processing apparatus 200 as a whole.

The shared memory 230 is shown as being divided into a number of distinct parts. A first part of the memory is used for commands that are transmitted by the agent circuit 220 and obtained by the power controller circuitry 210. A second part of the memory is used for notifications (e.g. requested data sent as a result of asynchronous commands), which are transmitted by the power controller circuitry 210 and obtained by the agent circuit 220. A third section is provided for the proactive data provided by the power controller circuitry 210. By breaking up the memory into a number of distinct sections, it is possible for the various components to access only the relevant part of memory, rather than potentially having to search all of memory for a new command or data. Note that also in this embodiment, the proactive data is provided in a number of domains. Each domain relates an operational characteristic of at least part of said data processing apparatus 200. In this embodiment, different data can be provided proactively to each domain. For example, Domain 0 might only receive the residency counter and Domain 1 might only receive the usage timer, with Domain 2 receiving both. As another example, Domain 2 might receive the residency counter more frequently than Domain 0. Domains are discussed in more detail with reference to FIG. 4.

Figure 3:
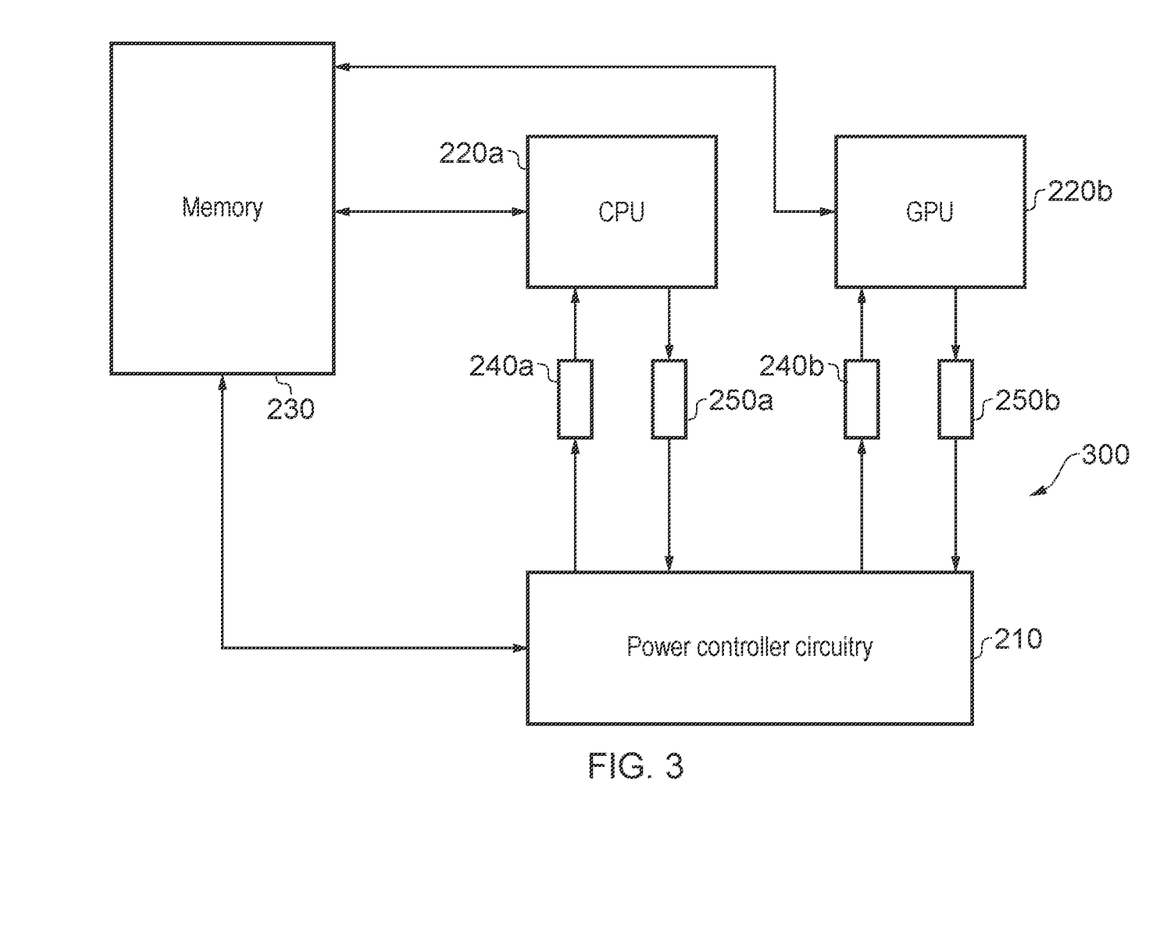
FIG. 3 is a schematic that shows controller circuitry, a plurality of agents, and a shared memory, in accordance with one embodiment.

FIG. 3 is a schematic that shows a data processing apparatus 300 comprising controller circuitry 210, a plurality of agents 220*a*, 220*b*, and a shared memory 230, in accordance with one embodiment. This embodiment is similar to the embodiment described with reference to FIG. 2. However, this embodiment includes a plurality of agent circuit 220*a*, 220*b*. Each of the agents has its own set of command doorbells 240*a*, 240*b* and notification doorbells 250*a*, 250*b*. However, in other embodiments, only one of each doorbell is provided, regardless of the number of agents.

Figure 4:
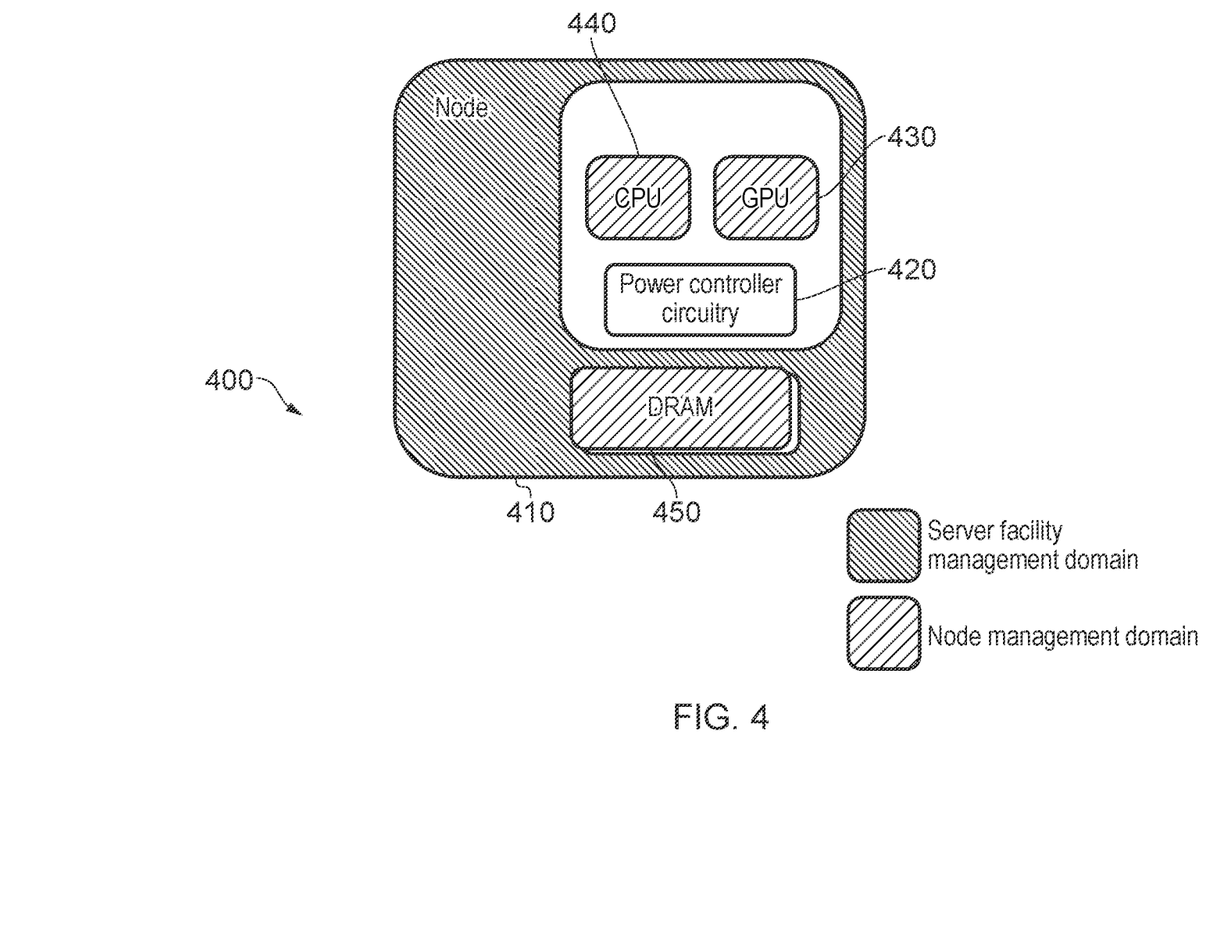
FIG. 4 shows the effect of domains and access provided to different agents.

FIG. 4 shows the effect of domains and access provided to different agents. In the embodiment of FIG. 4, the data processing apparatus 400 comprises a node (e.g. a server) 410, as could be found in a data centre. The node comprises a power controller circuitry 420 as previously discussed, as well as a GPU 430 and CPU 440. A bank of DRAMs 450 is provided as the shared memory. A first agent is the CPU, which has access to a node management domain. In the node management domain, the CPU has knowledge of the power consumption of each individual element of the node—e.g. the CPU 440 itself, the GPU 430, the DRAM 450, and so on. However, a management device that manages a collection of nodes requires knowledge of the total power consumption of the node without necessarily being aware of the power consumption of each individual element. Therefore, a server facility management domain gives coarser granularity access to the same data. The various commands, requested data, and proactive data are therefore restricted in order to enforce these domains. For example, the node management domain might define a command that queries the individual power consumption for a single component but the server facility management domain might not have this command defined.

Figure 5:
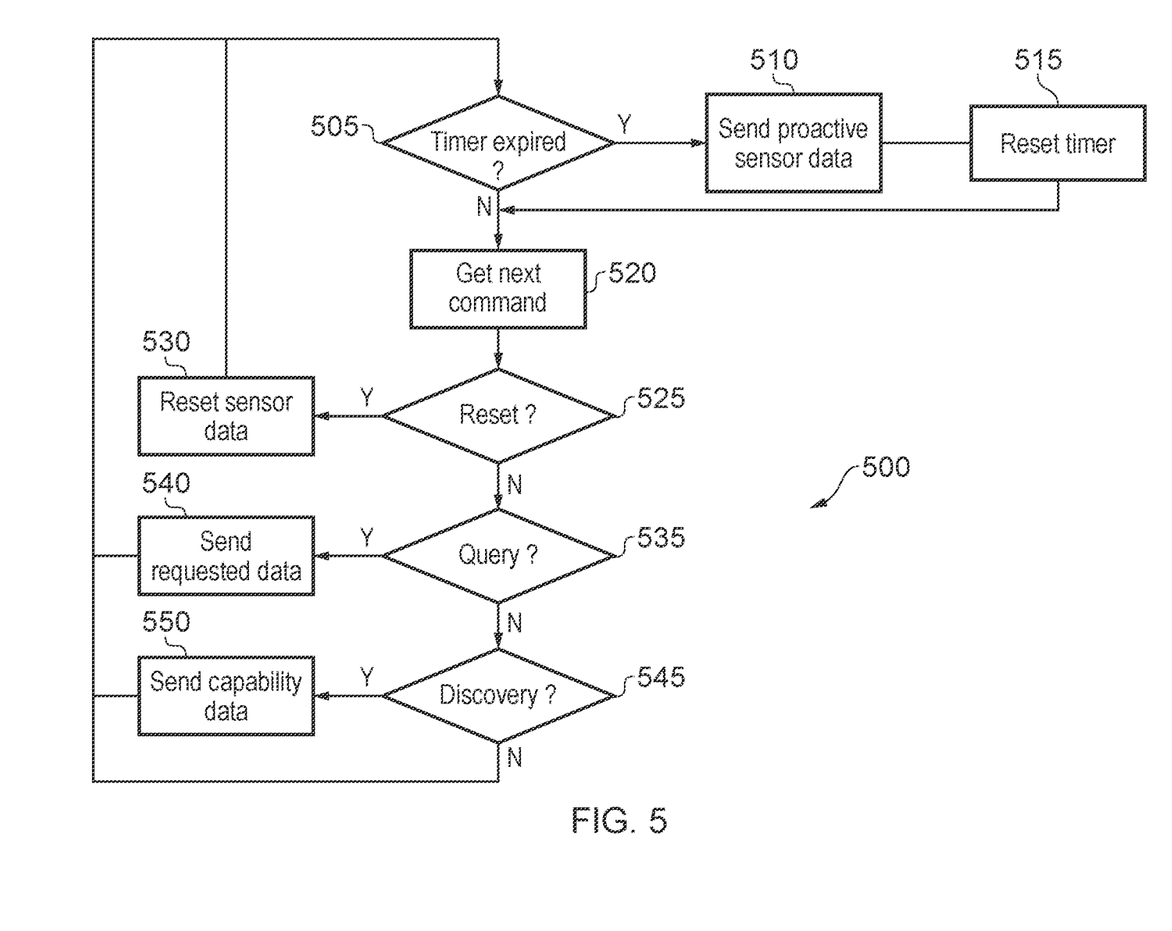
FIG. 5 is a flow chart that shows an example of behaviour of a controller in accordance with one embodiment.

FIG. 5 is a flow chart 500 that shows an example of behaviour of a controller circuitry in accordance with one embodiment. At a step 505, the controller circuitry checks whether its timer has expired. If so, then at step 510, proactive sensor data is transmitted to the shared memory. Then, at a step 515, the timer is reset at the process proceeds to step 520. Accordingly, every period of time, sensor data is transmitted to the shared memory and this occurs independently of any request for that data. In this case, the transmission of the proactive data is controlled solely by the expiration of the timer. If the timer has not expired, the process also proceeds to step 520.

At a step 520, a next command is obtained from the shared memory. At a step 525, it is determined whether or not the command is a reset data command. If so then at step 530, the sensor data is reset and the process returns to step 505. If the command is not a reset data command, then the process proceeds to step 535, where it is determined whether the command is a query for the sensor data. If so, then at step 540, the requested data is sent, and then the process returns to step 505. If the command is also not a query command, then at step 545, it is determined whether or not the command is a discovery command. If so, then at step 550, capability data is sent and the process returns to step 505. The capability data defines the reset command, the query command and the discover command, and also indicates that the sensor data will be provided proactively. It also indicates the predetermined period with which the sensor data will be provided proactively, and where the proactive data can be found (e.g. an address location and length). Finally, if the command is not the discovery command then the process returns to step 505, since the command is not one recognised by this controller circuitry.

In this way, the controller circuity's capabilities can be discovered, thereby not requiring specific implementation code to be provided at the operating system level. Additionally, with a low latency it is possible for sensor data to be acquired. If up-to-date sensor data is required then an explicit query command can be sent. This could be higher latency, since it requires the command to be issued, picked up by the controller circuitry, processed, the data to be gathered, uploaded to the shared memory and then accessed by the agent. However, it should then be up-to-date. Finally, the controller also supports a reset of the data. For example, if the data is a counter of the number of times that an event has been sensed, then the reset command causes that counter to be reset.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising controller circuitry, said controller circuitry comprising:
   processing circuitry to execute a stream of instructions; and
   communication circuitry:
      to obtain a command from shared storage circuitry to cause said processing circuitry to execute a subset of instructions in said stream of instructions, and
      to proactively transmit additional data, other than the command, to said shared storage circuitry, without receiving a specific command to transmit the additional data from the shared storage circuitry, wherein
   said controller circuitry comprises power controller circuitry to control power provided to one or more components;
   said one or more components comprise said data processing apparatus, which is adapted to operate in one of a plurality of power states; and
   said additional data relates to operation of said data processing apparatus over a period of time and comprises a residency counter that indicates a period for which said data processing apparatus has been operated in a current power state in said plurality of power states and a usage counter that indicates a number of times said data processing apparatus has entered said current power state.

2. A data processing apparatus according to claim 1, wherein
   said communication circuitry is further adapted to transmit requested data to said shared storage circuitry in response to a command received via said communication circuitry.

3. A data processing apparatus according to claim 2, further comprising:
   requested data signalling circuitry to signal that said requested data is obtainable from said shared storage circuitry.

4. A data processing apparatus according to claim 2, in response to a discover command obtained from said shared storage circuitry and provided to said shared storage circuitry by an agent circuit, said requested data comprises information relating to interaction capabilities between said agent circuit and said controller circuitry.

5. A data processing apparatus according to claim 1, further comprising:
   command signalling circuitry to signal to said controller circuitry that a new command is obtainable from said shared storage circuitry.

6. A data processing apparatus according to claim 1, wherein
   said additional data relates to operation of said data processing apparatus over a period of time.

7. A data processing apparatus according to claim 1, further comprising:
   said shared storage circuitry.

8. A data processing apparatus according to claim 1, wherein said processing circuitry is responsive to a counter reset command from said shared storage circuitry to reset at least some of said additional data.

9. A data processing apparatus according to claim 7, wherein
said shared storage circuitry comprises at least one memory bank.

10. A data processing apparatus according to claim 7, wherein
said shared storage circuitry is partitioned into at least two parts, including a first part for storing commands, and a second part for storing said additional data.

11. A data processing apparatus according to claim 7, wherein
said communication circuitry is further adapted to transmit requested data to said shared memory in response to a command received via said communication circuitry; and
said shared storage circuitry is partitioned into at least three parts, including a first part for storing commands, a second part for storing said additional data, and a third part for storing said requested data.

12. A data processing apparatus according to claim 1, further comprising:
at least one agent circuit to store a command in said shared circuitry for said controller circuitry, and to obtain said additional data from said shared circuitry.

13. A data processing apparatus according to claim 12, wherein
said controller circuitry controls access to a resource to each of said plurality of agent circuits; and
each agent circuit in said plurality of agent circuits is to issue a resource request command to said shared storage circuitry to request a change in said resource provided to that agent circuit.

14. A data processing apparatus according to claim 1, wherein
said at least one agent circuit comprises a plurality of agent circuits.

15. A data processing apparatus according to claim 14, wherein
said processing circuitry is to perform arbitration between resource request commands received from said plurality of agent circuits; and
in response to said arbitration, said processing circuitry changes said access to said resource.

16. A data processing apparatus according to claim 14, wherein
said resource is a power consumption.

17. A data processing apparatus according to claim 14, wherein
said communication circuitry is further adapted to transmit requested data to said shared storage circuitry in response to a command received via said communication circuitry; and
at least one of said command, said requested data, and said additional data is restricted according to one or more domains, each of said one or more domains relating to an operational characteristic of at least part of said data processing apparatus.

18. A data processing apparatus according to claim 1, wherein the communication circuitry is to proactively transmit the additional data without receiving an explicit unsolicited command to do so from outside the controller circuitry.

19. A method of operating a data processing apparatus, the method comprising:
executing a stream of instructions;
obtaining a command from shared storage circuitry to cause processing circuitry in the data processing apparatus to execute a subset of instructions in said stream of instructions; and
proactively transmitting additional data, other than the command, to shared storage circuitry in the data processing apparatus, without receiving a specific command to transmit the additional data from the shared storage circuitry, wherein
said additional data relates to operation of the data processing apparatus over a period of time and comprises a residency counter that indicates a period for which said data processing apparatus has been operated in a current power state in said plurality of power states and a usage counter that indicates a number of times said data processing apparatus has entered said current power state.

* * * * *